United States Patent [19]

Badawey et al.

[11] Patent Number: 5,048,279
[45] Date of Patent: Sep. 17, 1991

[54] LEAF MULCHER FOR USE WITH A ROTARY BLADE POWER LAWNMOWER

[76] Inventors: George W. Badawey, 408 Catherine Street, Port Colborne, Ontario, Canada, L3K 4L5; Theodore M. deRuiter, 19M-41 Brown Street, Wainfleet, Ontario, Canada, L0S 1V0

[21] Appl. No.: 476,593

[22] Filed: Feb. 7, 1990

[51] Int. Cl.⁵ .................... A01D 67/00; A01D 75/00
[52] U.S. Cl. .................... 56/320.2; 56/17.4; 56/255
[58] Field of Search .......... 56/320.2, 1, 255, 17.4, 56/320.1, 17.5

[56] References Cited

U.S. PATENT DOCUMENTS

| | | | |
|---|---|---|---|
| 2,659,191 | 11/1953 | Miller et al. | 56/12.9 |
| 2,791,080 | 5/1957 | Shaw | 56/320.2 |
| 2,942,400 | 6/1960 | Sylvester | 56/17.4 |
| 2,983,096 | 5/1961 | Phelps | 56/320.2 |
| 3,391,524 | 7/1968 | Nickoloff et al. | 56/320.2 |
| 3,884,020 | 5/1975 | Dahl et al. | 56/320.2 |
| 4,189,904 | 2/1980 | Paker | 56/320.2 |
| 4,306,409 | 12/1981 | Wulfers | 56/320.2 |

*Primary Examiner*—Bruce M. Kisliuk
*Attorney, Agent, or Firm*—Daryl W. Schnurr

[57] ABSTRACT

A leaf mulcher is an attachment to a rotary blade power lawnmower. The mulcher has a screen surrounded by a frame with a flange extending from the frame to provide attachment means to the lawnmower. The mulcher is mounted so that the screen transverses a grass outlet on the lawnmower while leaving a space between the outlet and the screen to allow some of the cuttings to escape from the outlet without passing through the screen.

7 Claims, 1 Drawing Sheet

LEAF MULCHER FOR USE WITH A ROTARY BLADE POWER LAWNMOWER

BACKGROUND OF THE INVENTION

1. Field of the Invention

This invention relates to a leaf mulcher for use with a rotary blade power lawnmower.

2. Description of the Prior Art

Previous leaf mulchers are too complex, or too expensive, or they do not operate effectively enough to eliminate the necessity of raking or otherwise collecting and disposing of leaves. During the Autumn of each year, as leaves fall from trees, the leaves are most often raked into appropriate piles and ultimately collected and disposed of. More recently, powerful blower devices have been developed in order to blow the leaves into appropriate piles rather than raking them. Once the leaves are in the piles, the procedure remains the same and the leaves are ultimately collected and carted away from the premises where they were originally located. Sometimes the leaves are bagged by a homeowner for disposal as garbage. On other occasions, homeowners will pile the leaves at the roadside and the municipality will collect the leaves for disposal using a huge vacuum system on a truck.

SUMMARY OF THE INVENTION

It is an object of the present invention to provide a leaf mulcher that is inexpensive to manufacture, simple to use and sufficiently efficient to eliminate any raking, collecting or transporting of the leaves collected.

A leaf mulcher for use with a rotary blade power lawnmower having a grass outlet of a defined width for cuttings created by the blade as said mower moves along the ground has a screen and support means therefor. There are means to mount the screen on said mower on an outside of said outlet so that said screen at least partially transverses the width of said outlet, said mulcher not closing off said outlet towards said ground.

DESCRIPTION OF A PREFERRED EMBODIMENT

Figure 1:
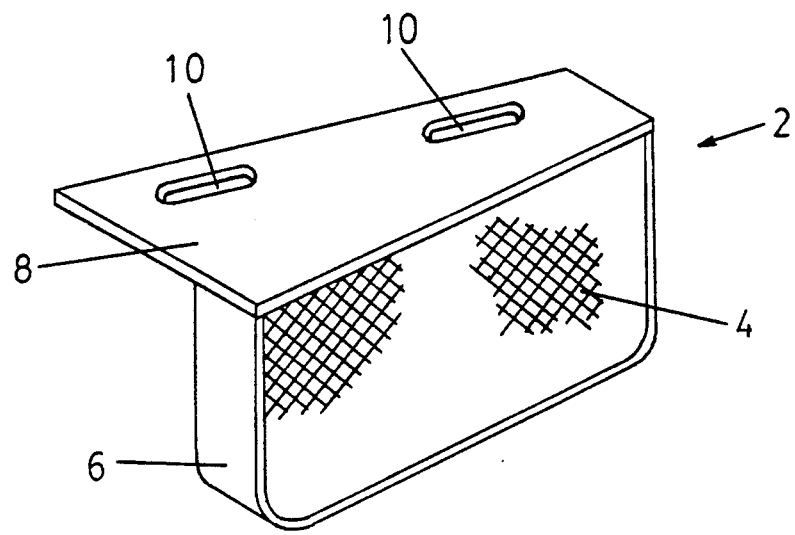
FIG. 1 is a perspective view of a leaf mulcher.

Referring to FIG. 1 in greater detail, a leaf mulcher 2 has a screen 4 and support means therefor 6. The support means 6 is a frame around said screen with a flange 8 providing the frame along one side of the screen 4, said flange also providing means to mount said screen on said mower. Within the flange 8, there are located two openings 10 which can be utilized to receive bolts (not shown in FIG. 1) to affix the mulcher 2 to a lawnmower (not shown in FIG. 1). It can be seen that the flange increases in width along a length of the screen.

Figure 2:
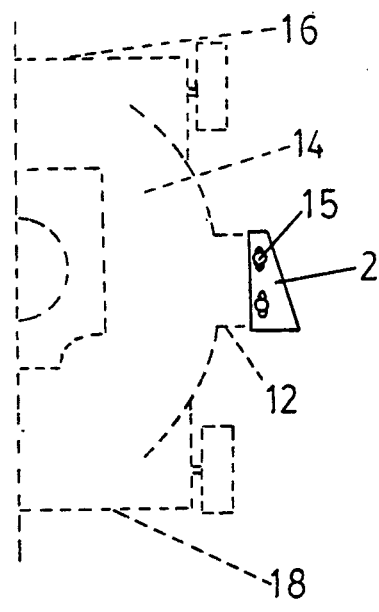
FIG. 2 is a partial top view of a lawnmower having a grass outlet with a leaf mulcher attached to said outlet.

In FIG. 2, the leaf mulcher 2 is mounted on a grass outlet 12 of a lawnmower 14 with bolts 15 extending through the openings 10. The lawnmower 14 has a front 16 and a rear 18. It can be seen that the grass outlet 12 has a defined width. The mulcher 2 is mounted so that the screen 4 (not shown in FIG. 2) transverses the entire outlet. The screen 4 is located in one plane and is mounted diagonally relative to a direction of flow of grass cuttings from the grass outlet when the lawnmower is in operation. In other words, the screen and frame are angled away from said outlet towards a rear 18 of said lawnmower.

Figure 3:
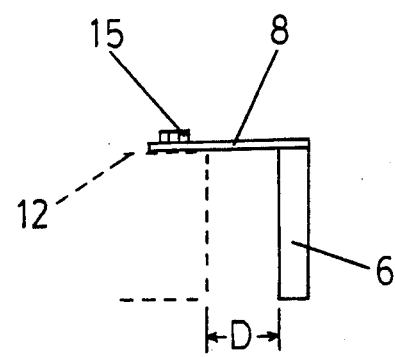
FIG. 3 is a rear view of the leaf mulcher attached to the grass outlet.

As can best be seen from FIG. 3, the frame 6 and screen 4 (not shown in FIG. 3) are spaced apart from the outlet 12 by a distance D. This space allows solid debris, such as walnuts, twigs, stones and the like to escape from the grass outlet. Further, as the leaves build up, the excess of leaves that cannot pass through the screen 4 can escape from the outlet around a side of said screen through the space D. Preferably, the screen is made from expanded metal and, still more preferably, the screen is an expanded metal screen of substantially a number thirteen size.

During operation of the lawnmower, when the leaf mulcher is mounted as shown in FIG. 3, the lawnmower is directed through a layer of leaves located on the grass with the power blade rotating. In other words, the mower is directed over the lawn in the same manner as it would be if the grass was being mowed and there were no leaves on the grass. As the mower is directed through the leaves, a large portion of the leaves will be forced by the air flow from the grass outlet through said screen. Where the layer of leaves is particularly thick, there may be a buildup of leaves within the grass outlet and all of the leaves will not pass through the screen. However, the rotary blade will assist the mulcher in cutting the leaves into smaller particles. Also, the leaves exiting the grass outlet will strike the screen to break them up further. Therefore, even if some of the leaves do not pass through the screen, they will be small enough to fall between the blades of grass on the lawn. The leaves that do pass through the screen 4 will also be small enough to fall between the blades of grass on the lawn. When the lawnmower passes over the leaves, they will essentially disappear and can be left on the lawn to provide fertilizer for the grass.

Thus, it is not necessary to rake the leaves or collect them in piles or bags for ultimately transporting the leaves from the lawn. In many cities, the Municipal Works Department collects the leaves that have been piled at the roadside by a homeowner and carts them away to a waste disposal site. Obviously, this is extremely expensive. With the mulcher of the present invention, this large expense can be saved. In addition, the homeowner can save a lot of work and, at the same time, provide the lawn with needed nourishment.

The size and location of the grass outlet on the mower will determine the design of the leaf mulcher. Numerous variations, within the scope of the attached claims, will be readily apparent to those skilled in the art.

What we claim as our invention is:

1. A leaf mulcher for use with a rotary blade power lawnmower having a grass outlet of a defined width for cuttings created by the blade as said mower moves along the ground, said mulcher comprising a screen and support means therefor, with means to mount said screen on said mower on an outside of said outlet so that said screen transverses the entire outlet, but is oriented to provide an opening for some of said cuttings leaving the grass outlet to escape around a side of said screen without passing through said screen, said mulcher also not closing off said outlet towards said ground.

2. A mulcher as claimed in claim 1 wherein the screen is located in one plane and is mounted diagonally relative to a direction of flow of cuttings from said grass outlet.

3. A mulcher as claimed in claim 2 wherein a forward edge of said screen is located against said grass outlet and said screen is angled away from said outlet towards a rear so that said screen is spaced apart from said grass outlet at said rear.

4. A mulcher as claimed in claim 3 wherein the means to mount said screen on said mower is a flange extending from the support means to said mower.

5. A mulcher as claimed in claim 4 wherein the support means for the screen is a frame which surrounds said screen.

6. A mulcher as claimed in any one of claims 1, 2 or 3 wherein the screen is an expanded metal screen.

7. A mulcher as claimed in any one of claims 1, 2 or 3 wherein the screen is an expanded metal screen of substantially a number thirteen size.

* * * * *